(12) United States Patent
Essiounine

(10) Patent No.: US 10,688,399 B2
(45) Date of Patent: Jun. 23, 2020

(54) GROUP GAMEPLAY WITH USERS IN PROXIMITY USING A GAMING PLATFORM

(71) Applicant: Roblox Corporation, San Mateo, CA (US)

(72) Inventor: Dmitri V. Essiounine, San Diego, CA (US)

(73) Assignee: Roblox Corporation, San Mateo, CA (US)

( * ) Notice: Subject to any disclaimer, the term of this patent is extended or adjusted under 35 U.S.C. 154(b) by 249 days.

(21) Appl. No.: 15/901,316

(22) Filed: Feb. 21, 2018

(65) Prior Publication Data

US 2019/0255446 A1    Aug. 22, 2019

(51) Int. Cl.
| | |
|---|---|
| A63F 13/847 | (2014.01) |
| A63F 13/87 | (2014.01) |
| A63F 13/32 | (2014.01) |
| A63F 13/27 | (2014.01) |

(52) U.S. Cl.
CPC ............ *A63F 13/847* (2014.09); *A63F 13/27* (2014.09); *A63F 13/32* (2014.09); *A63F 13/87* (2014.09)

(58) Field of Classification Search
CPC combination set(s) only.
See application file for complete search history.

(56) References Cited

U.S. PATENT DOCUMENTS

| | | |
|---|---|---|
| 2006/0135264 A1 | 6/2006 | Shaw et al. |
| 2007/0077992 A1 | 4/2007 | Midgley et al. |
| 2007/0218997 A1 | 9/2007 | Cho |
| 2009/0042644 A1 | 2/2009 | Zielinski |
| 2011/0250971 A1 | 10/2011 | Van Os et al. |
| 2017/0354893 A1* | 12/2017 | Benedetto ............... A63F 13/88 |

OTHER PUBLICATIONS

The Game Designers Studio, "Final Fantasy Crystal Chronicles," Feb. 9, 2004, instruction manual (Year: 2004).*
USPTO, International Search Report for International Patent Application No. PCT/US2019/018495, dated May 8, 2019, 6 pages.
USPTO, Written Opinion for International Patent Application No. PCT/US2019/018495, dated May 8, 2019, 6 pages.

* cited by examiner

*Primary Examiner* — Kevin Y Kim

(57) ABSTRACT

A method and system is disclosed that receives a user request for group gameplay of a multiplayer game. The group gameplay enables users to participate in the multiplayer game using secondary client devices as game controllers to control the gameplay and causes the gameplay to be presented on a primary display for consumption by the users. The method and system receive from the plurality of secondary client devices, control instructions that have bypassed a primary client device. The control instructions are responsive to user input to the secondary client devices to control actions in the multiplayer game. The method and system responsive to receiving the control instructions that have bypassed the primary client device, provide first gameplay instructions to the primary client device that cause a presentation of a first view of the gameplay of the multiplayer game on the primary display for consumption by the users.

20 Claims, 7 Drawing Sheets

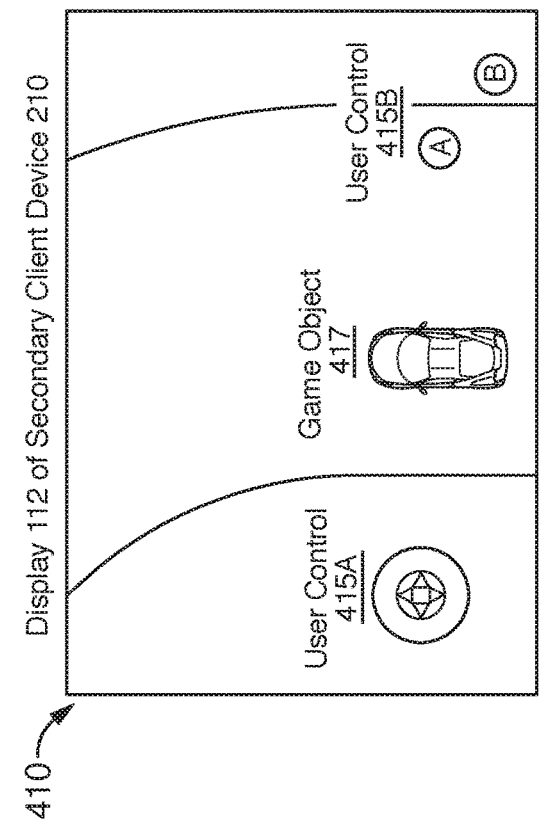
FIG. 4A
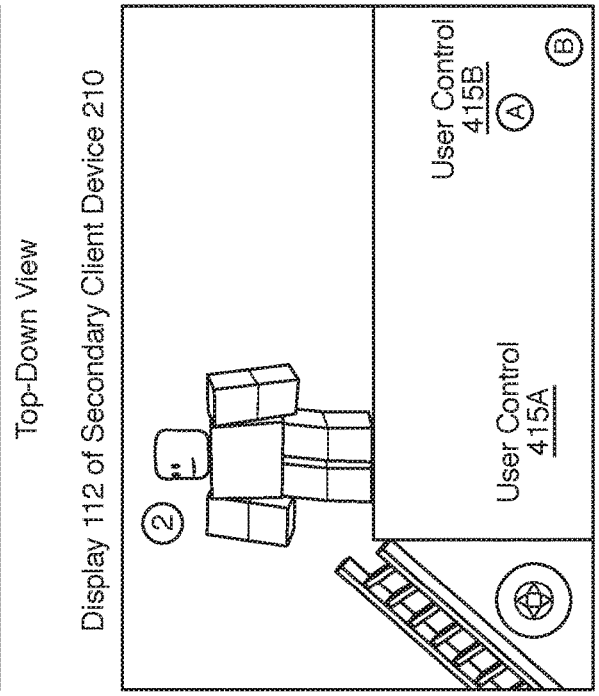
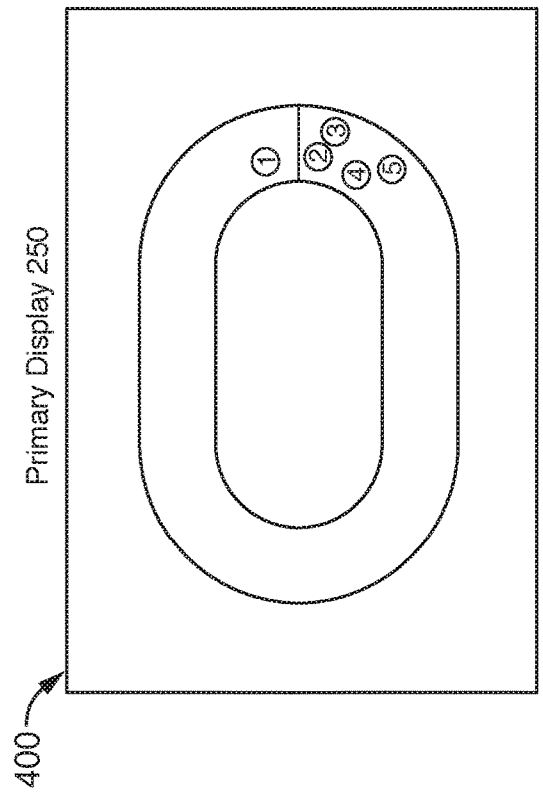
FIG. 4B
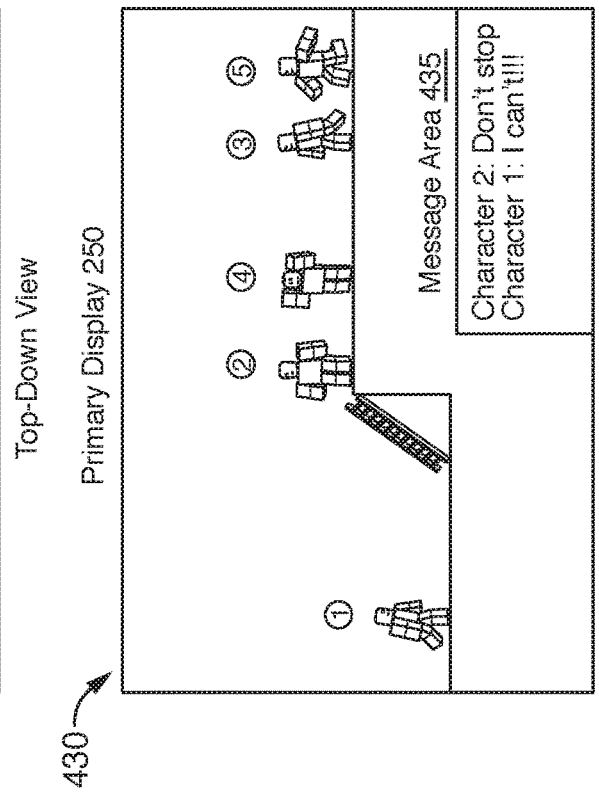

GROUP GAMEPLAY WITH USERS IN PROXIMITY USING A GAMING PLATFORM

TECHNICAL FIELD

This disclosure relates to the field of gaming platforms and, in particular, to providing group gameplay with users that are proximately located using a gaming platform.

BACKGROUND

Collaboration platforms allow users to connect to and share information with each other via the Internet. Users of a collaboration platform, such as a gaming platform, may participate in multiplayer gaming environments, design custom gaming environments, decorate avatars, or exchange virtual items with other users, and so forth.

DESCRIPTION OF DRAWINGS

Various implementations of the disclosure will be understood more fully from the detailed description given below and from the accompanying drawings of various implementations of the disclosure.

FIG. 4A-4C illustrates views of gameplay of a multiplayer game on a primary display and views of gameplay of the multiplayer game on a display of a secondary client device, in accordance with implementations of the disclosure.

DETAILED DESCRIPTION

Figure 1:
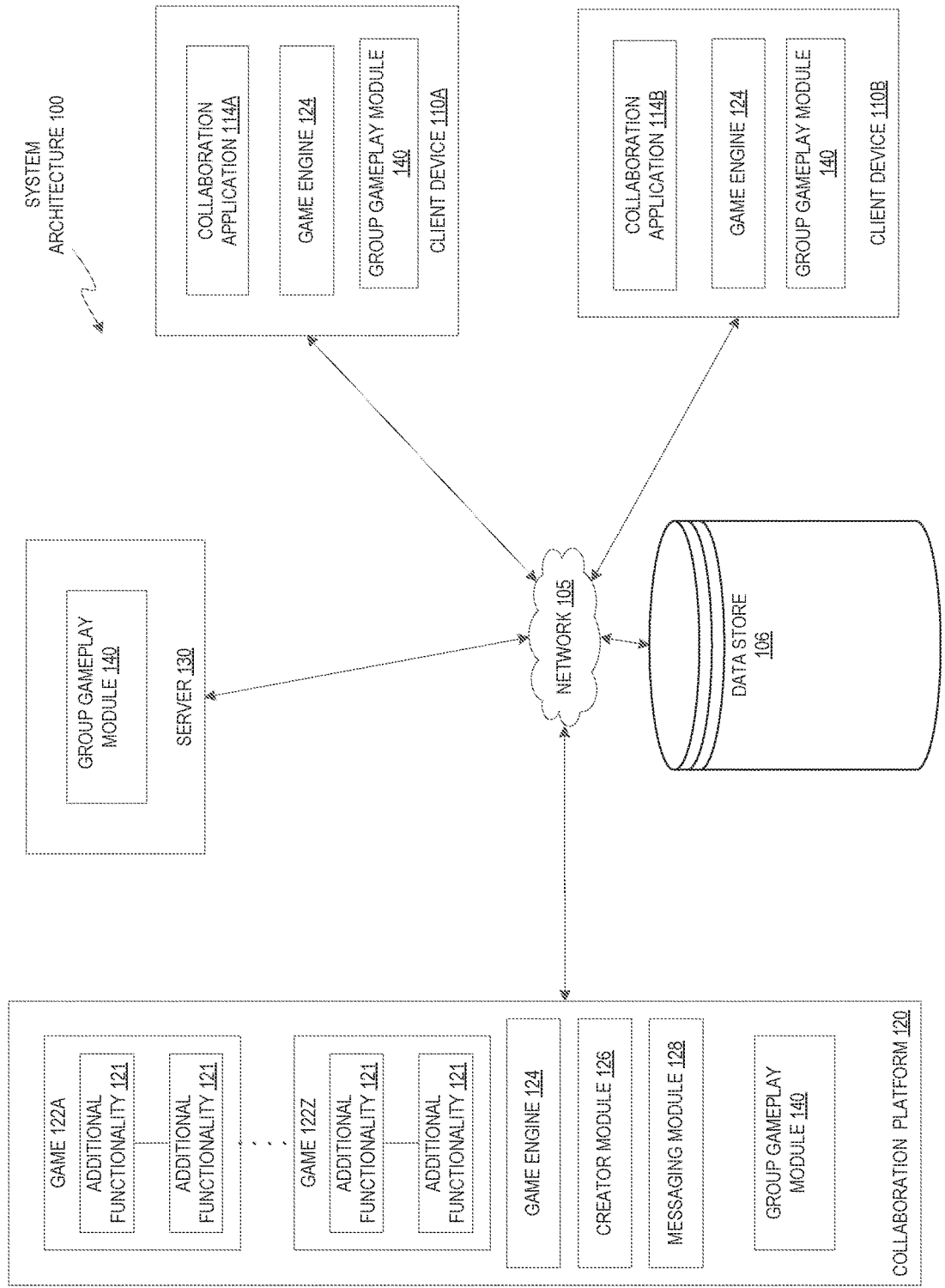
FIG. 1 illustrates an example system architecture, in accordance with implementations of the disclosure.

Collaboration platforms, such as gaming platforms, offer a variety of ways for users to interact with one another. For example, users of a gaming platform may work together towards a common goal, share various virtual gaming items, send electronic messages to one another, and so forth. Users of a collaboration platform may play games (e.g., playing users) with characters or create games (e.g., creating users) with developmental tools via the collaboration platform.

In some systems, a playing user may play a game online with one or more other playing users, some of whom may be located in the same location (e.g., proximately located). For example, multiple playing users may use a gaming console to play a game hosted online and use the native game controllers of the gaming console to control in-game actions and interact with the game. The playing users may watch the gameplay on a central display, such as a television, and enjoy the gaming experience together. Playing users may use the native game controllers of the gaming console to control in-game actions. The number of playing users that may participate in the gameplay may be determined by the number of native game controllers or the capabilities (e.g., computational capabilities such as processing capabilities or network interface capabilities) of the gaming console.

In some systems, playing users of an online game may congregate at a central location to further enhance the gameplay experience. For example, playing users may participate in a Local Area Network party, colloquially referred to as a LAN party, where participants often bring their own computers and other hardware so that the participants may be proximately located while playing an online game. As the number of participants increases, the hardware complexity increases and presents challenges such as the shear amount of hardware required, properly networking the computers, adequate Internet access, as well as supplying adequate power to the hardware.

Aspects of the disclosure address the above-mentioned and other challenges by implementing a group gameplay feature for a multiplayer game that enables users that are proximately located to participate in a multiplayer game using secondary client devices, such as mobile phones, as game controllers to control gameplay. In implementations, the gameplay may be presented to the users on a primary display, such as a television, for consumption by the users. A server computer (e.g., collaboration platform) may receive from the secondary client devices control instructions that bypass a primary client device, such as a gaming console, and enable the number of users participating in the group gameplay at a particular location to scale (e.g., 1 to hundreds of playing users). The control instructions may be responsive to user input to the secondary client devices to control in-game actions in the multiplayer game. Responsive to receiving the control instructions that have bypassed the primary client device, the server computer may provide first gameplay instructions to the primary client device (e.g., gaming console). In some implementations, the primary client device (e.g., gaming console) may render a presentation of a first view of the gameplay of the multiplayer game on the primary display (e.g., television) using the first gameplay instructions from the server computer (e.g., collaboration platform), rather than using control instructions from the secondary client devices (e.g., mobile phones) or native gaming controllers of the primary client device.

In some implementations, responsive to the control instructions received from the secondary client devices (control instructions that bypassed the primary client device), the server computer sends second gameplay instruction directly to the secondary client devices (e.g., second gameplay instructions that bypass the primary client device). In some implementations, the secondary client devices may render a presentation of second views of the gameplay of the multiplayer game on the displays of the secondary client devices using the second gameplay instructions from the server computer (e.g., collaboration platform), rather than using instructions from the primary client device.

In implementations, the presentation of the gameplay on the primary display (e.g., television) may be different from the presentation of the gameplay on the secondary client devices. For example, the view of the gameplay on the primary display may be from the third-person perspective and present all the characters participating in the group gameplay. The views of the gameplay on the secondary client devices may also be from the third-person perspective, but present a smaller portion of the game world than the view on the primary display (e.g., third-person view of the respective character and immediate surroundings). In some implementations, the views of the gameplay on the secondary client devices may be different from one another. For example, the views of the gameplay on the secondary client devices may be from the first-person perspective and present the portion of the game world that the respective character is viewing.

In some implementations, multiple groups of users that are located in different locations may participate in different group gameplay sessions for the same game. For example, a first group of users may be located in a proximate location (e.g., same room) in the United States, and another group of user may be located in a proximate location in Norway. The two groups of users may play a multiplayer game where a first team of the first group of users competes against a second team of the second group of users. The first group of users may request a first group game session (e.g., to play together as a team). The first group of users may have a primary client device and a first group of secondary client devices coupled to collaboration platform. The second group of users may also request a second group gameplay session for the same multiplayer game (e.g., to play together as a team against the first team). The second group of users may have a different primary client device (e.g., different gaming console) and a second group of secondary client devices coupled to collaboration platform. The first team located in the United States and using the first group gameplay session may compete against the second team in Norway using the second group gameplay session. In some implementation, the view of the gameplay displayed on the primary display of the first group of users may be different from the view of the gameplay displayed on the primary display of the second group of users (e.g., to not provide an advantage to one team or another).

Accordingly, aspects of the disclosure provide users with a group gameplay feature that enables users that are proximately located to participate in a multiplayer game using secondary client devices as game controllers and causes the gameplay to be presented on a primary display for consumption by the users. In particular, the aforementioned addresses technological challenges of enabling users that are proximately located to participate in group gameplay. Enabling users that are proximately located to use secondary client devices to participate in group gameplay improves the technological process of collaborative gaming. The aforementioned group gameplay also improves the operation of a computer or computer network. For example, sending control instructions that bypass a primary client device to a collaboration platform hosting the game allows the number of users that participate in group gameplay to scale (e.g., from 1 to hundreds of playing users may participate in a group gameplay session). For example, by sending control instructions that bypass the primary client device, the control instructions are more efficiently transmitted to the collaboration platform, are not delayed by bottlenecks at the primary client device, and allow the primary client device to focus computing resources (e.g., processing resources or networking resources) on communications with the collaboration platform and on rendering the gameplay. Additionally, gameplay instructions that bypass the primary client device may be sent from the collaboration platform to the secondary client devices, which improve the operation of a computer or computer network. For example, a primary client device may not be able to handle multiple gameplay instructions to each secondary client devices in addition to other gaming functionalities, especially as the number of playing users increases. Sending gameplay instructions directly to the secondary client devices reduces latency caused by the primary client device and reduces the chances that the primary client device causes a bottleneck that throttles the rendering of real-time gameplay on the secondary client devices.

It may be noted that a collaboration platform described as a gaming platform herein is provided for purposes of illustration, rather than limitation. A collaboration platform may be one or more of numerous platforms, such as a gaming platform, a social networking platform, purchasing platform, a messaging platform, creation platform, and so forth. It may be further noted that aspects of the disclosure are illustrated using an example of a gaming platform and games for purposes of illustration, rather than limitation.

FIG. 1 illustrates an example system architecture 100, in accordance with implementations of the disclosure. The system architecture 100 (also referred to as "system" herein) includes client devices 110A and 110B (generally referred to as "client device(s) 110" herein), a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, cluster of physical servers, etc.). In implementations, the server 130 may be included in the collaboration platform 120, be an independent system, or be part of another system or platform. The server 130 may include group gameplay module 140.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110. It may be noted that collaboration application 114A and 114B may generally referred to as collaboration application(s) 114. In some implementations, collaboration application 114 may be two instances of the same application.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

In one implementation, collaboration platform 120 may be a gaming platform, such as an online gaming platform or virtual gaming platform. For example, the gaming platform may provide single-player or multiplayer games to a community of users that may access or interact with the games 122A-122Z using client devices 110 via network 105. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other users of the game 122.

In some implementations, a game 122 can include an electronic file that can be executed or loaded using software, firmware or hardware configured to present the game content (e.g., digital media item) to an entity. In some implementations, a game 122 may be executed by a game engine 124 to generate a gaming video including multiple frames and audio. The gaming video may be generated (e.g., rendered) by the game engine 124 based on commands or user input. In some implementations, a game engine 124 (e.g., a rendering engine of the game engine 124) receives user input and generates a gaming video based on the user input. In some implementations, a game engine 124 (either local to the client device 110 or at collaboration platform 120) receives user input and generates commands (e.g., rendering commands, graphics library commands, etc.) based on the user input. In some implementations, a game engine 124 (e.g., a rendering engine of the game engine 124) receives from collaboration platform 120 the generated commands and generates the gaming video based on the generated commands. The gaming video may be displayed via a user interface of a client device 110.

In some implementations, collaboration platform 120 hosts games 122 and allows users to interact with the games 122 using collaboration application 114 of client devices 110. Users of collaboration platform 120 may play, create, interact with, or build games 122, or create and build objects (e.g., also referred to as "item(s)" or "game objects" or "virtual game item(s)" herein) of games 122. For example, in generating user-generated virtual items, users may create characters, decoration for the characters, one or more virtual environments for an interactive game, or build structures used in a game 122, among others. In implementations, users may buy, sell, or trade game virtual game objects, such as in-platform currency (e.g., virtual currency), with other users of the collaboration platform 120. In implementations, collaboration platform may transmit game content to collaboration applications 114. Game content (also referred to as "content" herein) may refer to any data or software instructions (e.g., game objects, game, user information, video, images, commands, media item, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, position and velocity information of the characters of a game, etc.) to each of the client devices 110 to display interactions of the multiple users in a multiplayer gaming environment. In another implementation, collaboration platform 120 may transmit the game content from one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user(s) with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics, among other features. In some implementations, an instance of game engine 124 may be included on client devices 110. In some implementations, game engine 124 of client devices 110 may work independently, in collaboration with game engine 124 of collaboration platform 120, or a combination of both.

In implementations, collaboration platform 120 may include a creator module 126. In implementations, creator module 126 may allow users to become creators to design or create environments in an existing game 122 or create new games or create new game objects within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. An example of an environment may be a three-dimensional (3D) environment. The one or more environments of a game 122 may be collectively referred to a "world" or "gaming world" or "virtual world" or "universe" herein. An example of a world may be a 3D world of a game 122. For example, a user may build a virtual environment that is linked to another virtual environment created by another user. A character of the virtual game may cross the virtual border to enter the adjacent virtual environment. In implementations, game objects (e.g., also referred to as "item(s)" or "objects" or "virtual game item(s)" herein) may refer to objects that are used, created, shared or otherwise depicted in games 122 of the collaboration platform 120. For example, game objects may include a part, model, character, tools, weapons, clothing, buildings, vehicles, currency, flora, fauna, components of the aforementioned (e.g., windows of a building), and so forth. It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, and skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.). It may be noted that is some implementations, a character may not include a character game object (e.g., body parts, etc.) but the user may still control a character to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for view or use by other users of collaboration platform 120. It some implementations, creating, modifying, or customizing characters, other game objects, games 122, or game environments may be performed by a user using a user interface (e.g., developer interface) and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administrate games 122 and gaming environments using cloud-mediated computational resources, for example. In implementations, creator module 126 may use a user interface (also referred a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or place game objects within a game 122 or environment. The user may publish their selected game objects via the developer interface so that the game objects are available to playing users of the game 122 or environment.

In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web application (e.g., an application that operates in conjunction with a web browser) that can access, retrieve, present, and/or navigate content (e.g., virtual character in a virtual environment, etc.) served by a web server. In another example, collaboration application 114 may be a native application. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to build, create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130. In some implementations, collaboration application 114 of client device 110 may include game engine 124. In some implementations, game engine 124 of client device 110 may be separate from collaboration application 114A.

In implementations, a user may login to collaboration platform 120 via collaboration application 114. The user may access a user account by providing user account information (e.g., username and password) where the user account is associated with one or more characters available to participate in one or more games 122 of collaboration platform 120.

In general, functions described in one implementation as being performed by the collaboration platform 120 can also be performed on the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

For the sake of illustration, rather than limitation, group gameplay module 140 is described as implemented on collaboration platform 120. In other implementations, group gameplay module 140 may in part or wholly be implemented on server 130. In other implementations, group gameplay module 140 may in part or wholly be implemented on client devices 110. In other implementations, group gameplay module 140 operating on one or more of client device 110, server 130, or collaboration platform 120 may work in conjunction to perform the operations described herein. Although implementations of the disclosure are discussed in terms of collaboration platforms, implementations may also be generally applied to any type of platform providing connections between users. The group gameplay module 140 may help facilitate the operations described herein, such as operations described with respect to FIG. 2 through FIG. 5. In some implementations, the group gameplay module 140 may part of another application (e.g., collaboration application 114), such as a plug-in. In some implementations, group gameplay module 140 may be a separate application executing on the device.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
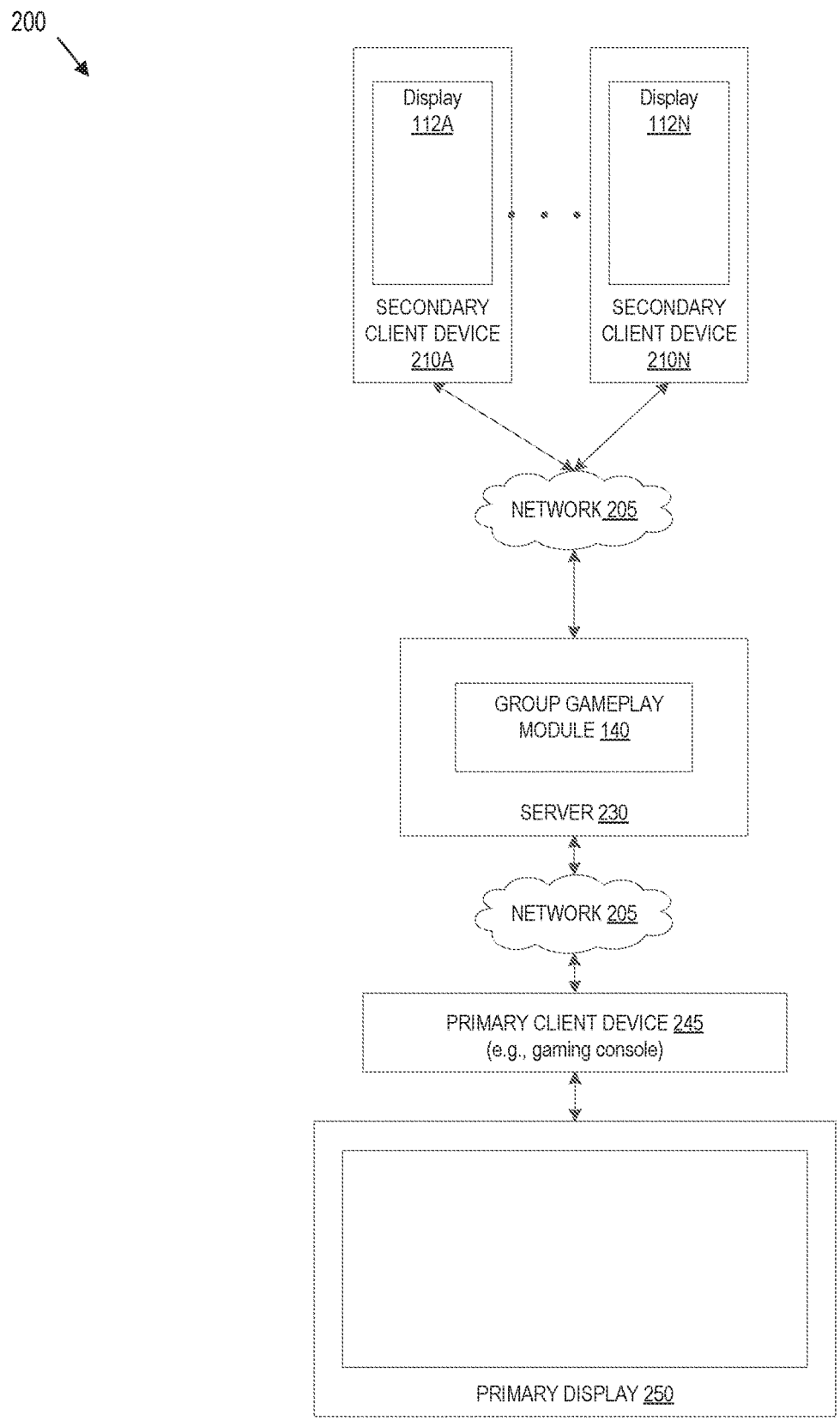
FIG. 2 illustrates another example system architecture, in accordance with implementations of the disclosure.

FIG. 2 illustrates another example system architecture 200, in accordance with implementations of the disclosure. Elements of system architecture 100 of FIG. 1 may be used to help illustrate FIG. 2. It may be noted that system architecture 200 (also referred to as "system" herein) is provided for purposes of illustration, rather than limitation. In implementations, system 200 may include some, all, none, or more of the elements of system 100 of FIG. 1.

In some implementations, users of system 200 may want to participate in group gameplay. Group gameplay may refer to gameplay (e.g., real-time gameplay) of a game where the participants (e.g., playing users) of the game are proximately located (e.g., same room). Users participating in group gameplay may view the gameplay on a common display, such as primary display 250.

In some implementations, system 200 may be used to implement a group gameplay feature to provide group gameplay to one or more groups of users that are proximately located. Primary client device 245, such as a gaming console, may be used to select a game hosted by server 230 (also referred to as "server computer" herein). Server 230 may implement a group gameplay feature that allows the playing users to participate in group gameplay for the selected game. Rather than use the gaming console's game controllers (e.g., native game controllers to the gaming console) to control the game, playing users may use their secondary client devices 210, such as mobile phones as game controllers to play the game. The secondary client devices 210 may have an application or plug-in that allows the secondary client devices 210 to be used as game controllers to control a game hosted by server 230. The secondary client devices 210 (e.g., mobile phones) used as game controllers may receive user inputs for the game and send control instructions (e.g., user inputs to control the game) to the server 230 that bypass the primary client device 245. For example, the control instructions from the mobile phone may be sent directly to the server 230, without being received or executed by the gaming console, via a LAN or WLAN (e.g., network 205). In some implementations, secondary client devices 210 sending control instructions that bypass the primary client device 245 allows the system 200 to scale for a large number of playing users. For instance, sending control instructions through the gaming console for a large number of users may result in a bottleneck at the gaming console, which may result in latency in the presentation of the gameplay. Subsequent to receiving control instructions from the secondary client devices 210, server 230 may send gameplay instructions (e.g., position and velocity information of the characters participating in the group gameplay or commands) to the primary client device 245. The primary client device 245 may use the gameplay instructions and render the gameplay for presentation on primary display 250. The gameplay may be presented in a first view (e.g., third-person view, split-screen first-person view) on the primary display 250 so that all the playing users may concurrently view their characters actions in the game in real-time. In implementations, the gaming console may not receive any control instructions for the gameplay form secondary client devices 210, which may allow primary client device 245 to and focus computing resources (e.g., processing resources, etc.) on instructions received from the server 230 and to render gameplay on the primary display 250.

In implementations, gameplay may refer to interaction of one or more players with a game (e.g., user inputs) and the presentation of the interaction on a display. Real-time or live gameplay may refer to the broadcast, presentation, or display of gameplay as the gameplay occurs, rather than past or recorded gameplay. For example, real-time gameplay may be displayed on primary display 250 substantially concurrent with user interaction with a game (at least within the technical limitations of displaying real-time action, e.g., the user interaction with the game may be displayed within milliseconds of user input and may appear to the user as if in absolute real-time).

In implementations, a view (also referred to as "field of view" herein) may refer to the extent of the observable game world that may be seen at any given moment from the perspective of the game camera and that is presented in the display of a client device. For example, the view of the game camera may be from a first-person perspective or a third-person perspective or some combination thereof.

In implementations, system 200 includes server 230 (e.g., hardware server computing device). Server 230 may be similar to or include similar elements as server 130 of FIG. 1. In implementations, server 230 may be part of collaboration platform 120. In other implementations, server 230 may be separate from collaboration platform 120. In implementations, server 230 includes group gameplay module 140.

In implementations, system 200 includes primary client device 245. Primary client device 245 may be similar to or include similar elements as client devices 110 of FIG. 1. In some implementations, primary client device 245 may include one or more of collaboration application 114, game engine 124, or group gameplay module 140 (not shown). In some implementations, primary client device may be a personal computer or a gaming console (e.g., Xbox™ or PlayStation™). In some implementations, the primary client device 245 may have accessories such as native game controllers (not shown) that interact with primary client device 245 and communicate user input to primary client device 245. "Native game controllers" may refer to the game controllers that interact directly with primary client device 245 (and may be dedicated devices for interaction with primary client device 245). It may be noted that "game controller(s)" may refer to the secondary client devices 210 herein, unless otherwise described.

In implementations, system 200 includes primary display 250. In some implementations, primary display 250 may be coupled to primary client device 245. In implementations, primary display 250 may receive display instructions from primary client device 245 and present a view of the gameplay of a game, such as a multiplayer game, on the primary display 250 for consumption by the users. In some implementations, the primary display 250 may be a television or a projector, for example. In implementations, the view displayed from the primary display 250 may be from a perspective (e.g., third-person perspective) so that all the playing users that are proximately located (e.g., same room) may watch the in-game actions of the playing users' respective characters.

System 200 includes secondary client devices 210A through 210N, generally referred to as secondary client devices 210 (also referred to as "game controllers" herein). Secondary client devices 210 may include any number of devices associated with any number of users. Secondary client devices 210 may be similar to and include similar elements as client devices 110 of FIG. 1. In some implementations, secondary client devices 210 may have a display, such as displays 212A-212N. In implementations, secondary client devices 210 may include one or more of collaboration application 114, game engine 124, or group gameplay module 140 (not shown). In some implementations, secondary client devices 210 may be mobile devices (e.g., mobile phone, tablet, etc.), personal computers, or a combination thereof, for example. For instance, a playing user may use a mobile phone as a game controller to control a character in a particular game that is being displayed on primary display 250. In some implementations, the secondary client device 210 may send control instructions (e.g., user inputs, such as right, left, up, down, user election, or character position and velocity information, etc.) directly to server 230, bypassing the primary client device 245. For example, the secondary client devices 210 may be connected to network 105, such as a LAN or WLAN, and send the control instructions to the server 230 via network 105, rather than through primary client device 245.

In some implementations, a view of the gameplay may be presented on the display 112 of secondary client devices 210 that is different from the view presented on primary display 250. For example, primary display 250 may present a view from the third-person perspective (e.g., top-down view), and each of the secondary client devices 210 may present a view from the first-person perspective for each of the respective characters associated with the secondary client devices 210. In some implementations, gameplay instructions may be sent directly from server 230 to secondary client devices 210 (bypassing primary client device 245) where the gameplay instructions may be used by the respective secondary client devices 210 to render a view of the gameplay on the respective secondary client device 210.

In implementations, server 230 may be coupled to primary client device 245 or secondary client devices 210 via network 205. Network 205 may be similar to network 105 as describe with respect to FIG. 1. In some implementations, network 205 may include a WLAN or LAN.

As noted above, in some implementations multiple groups of users that are located in different locations may participate in different group gameplay sessions for the same game. For example, a first group of users may be located in a proximate location (e.g., same room) in the United States, and another group of user may be located in a proximate location in Norway. The two groups of users may play a multiplayer game where a first team of the first group of users competes against a second team of the second group of users. Each of the groups of users may use a system 200 to implement the group gameplay sessions. For example, the first group of users may request a first group game session (e.g., to play together as a team) using primary client device 245. The first group of users may have a primary client device 245 and a first group of secondary client devices 210 coupled to collaboration platform (e.g., server 230). The second group of users may also request a second group gameplay session for the same multiplayer game (e.g., to play together as a team against the first team) using a different primary client device. The second group of users may have the different primary client device (e.g., different gaming console) and a second group of secondary client devices coupled to collaboration platform (e.g., server 230). The first team located in the United States and using the first group gameplay session may compete against the second team in Norway using the second group gameplay session.

Figure 3:
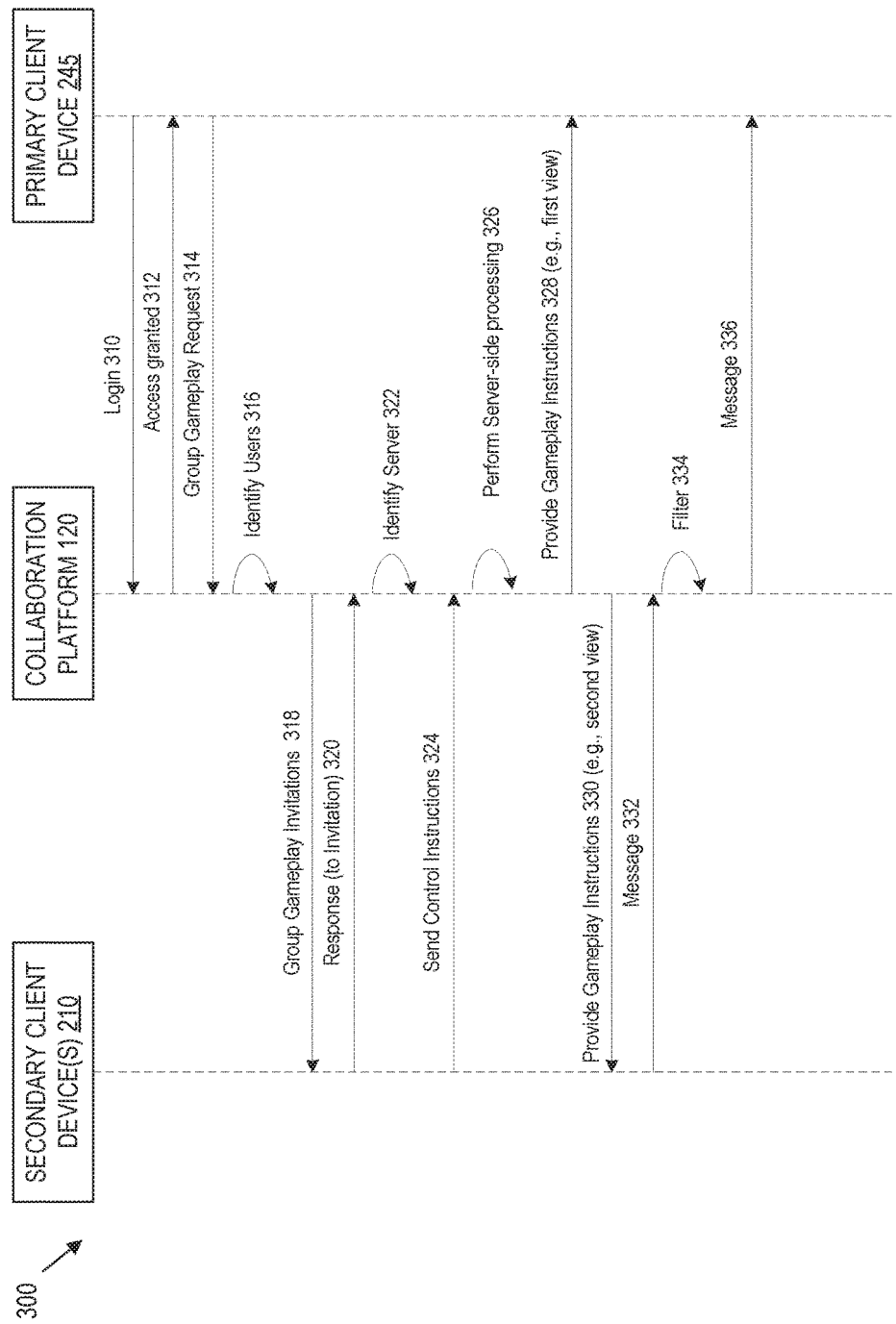
FIG. 3 is a diagram of operations for group gameplay, in accordance with implementations of the disclosure.

FIG. 3 is a diagram of operations for group gameplay, in accordance with implementations of the disclosure. System 300 may include similar elements as system architecture 100 as described with respect to FIG. 1 and system architecture 200 described with respect to FIG. 2. It may be noted that elements of FIG. 1 and FIG. 2 may be used herein to help describe FIG. 3. In some implementations, collaboration platform 120 (using group gaming module 140) or server 230 may interact with secondary client devices 210 (using respective group gameplay modules 140) and primary client device 245 (using group gameplay module 140) to perform operations described with respect to FIG. 3. In other implementations, any of the devices with respect to system 100 of FIG. 1 or system 200 of FIG. 2 may perform one or more of the operations described with respect to FIG. 3. For purpose of illustration, rather than limitation, operations described as performed by collaboration platform 120 may be performed by one or more elements of collaboration platform 120, unless otherwise described. For purposes of illustration, rather than limitation, one or more operations performed by secondary client device 210 may be performed by one or more of collaboration application 114, group gaming module 140, or game engine 124. For purposes of illustration, rather than limitation, one or more operations performed by primary client device 245 may be performed by one or more of collaboration application 114, group gaming module 140, or game engine 124. It may be noted that for the purposes of illustration, rather than limitation, a single secondary client device 210 is shown. It may be further noted that any number of secondary client devices 210 may be implemented in a similar manner as described with respect to secondary client device 210 of FIG. 3. The operations described with respect to FIG. 3 are shown to be performed serially for the sake of illustration, rather than limitation. It may be noted that in implementations the operations may be performed in any order, may be performed multiple times, or may include the same, fewer, or additional operations.

In implementations, operation 310 may include a login operation. For example, a user may use a native game controller of the primary client device 245 to access the collaboration platform 120. For example, a user may supply login information, such as user account information (e.g., username and password) to collaboration platform 120 via primary client device 245. In implementations, collaboration platform 120 may verify the login information.

In implementations, responsive to the verification, collaboration platform 120 may perform operation 312 and grant the user of primary client device 245 access to collaboration platform 120 and the user account content associated with particular user account. Responsive to the login information not being verified, collaboration platform 120 may request the user of primary client device 245 to re-submit login information and deny access to collaboration platform 120 until the login information is verified. In alternative implementations, a user may use secondary client device 210 to perform operation 310.

In implementations, at operation 314 the user of primary client device 245 may submit a user request for a group gameplay feature of a multiplayer game to collaboration platform 120. In one example, the user may use the native game controller of primary client device 245 to submit the request to collaboration platform 120. In an example, the user of primary client device 245 may select a game hosted by collaboration platform 120 using primary client device 245. Responsive to selecting the game, primary client device 245 may automatically send the user request for group gameplay (e.g., the selected game only supports group gameplay).

In another example, a user may access collaboration platform 120 using primary client device 245 and access games hosted by collaboration platform 120 that include a "group gameplay" feature. The user may select a game and further select the group gameplay feature (e.g., user interface element), which initiates the primary client device 245 to send the user request for group gameplay to collaboration platform 120.

In some implementations, subsequent to receiving the user input requesting group gameplay, the native game controller associated with the primary client device 245 may become inactive (e.g., does not contribute to control of characters in the selected game) except for quitting or exiting the game on behalf of primary client device 245. In alternative implementations, the user request may be sent from the secondary client device 210 to the collaboration platform 120 (e.g., operation 314 may be performed by secondary client device 210).

In implementations, at operation 316 responsive to receiving, from the primary client device 245, a user request for the group gameplay feature of the game, collaboration platform 120 identifies users to include in the group gameplay for the game. In some implementations, the user request for group gameplay may specify one or more users that are to be invited to the group gameplay. For example, the user that sent the user request for group gameplay may select a group of users that are included in the group gameplay. The group of users may be included in the user request for group gameplay that is sent to collaboration platform 120. Collaboration platform 120 may parse the user request for group gameplay to identify the users to include in group gameplay.

In other implementations, collaboration platform 120 may identify users that are logged into collaboration platform 120 and are accessing the same LAN or WLAN as primary client device 245. For example, the collaboration platform 120 may identify a network identifier associated with the user request of the group gameplay feature. The collaboration platform 120 may identify the users accessing the collaboration platform 120 and using the same network identifier. In some implementations, a network identifier may include an identifier that identifies the WLAN or LAN being accessed by secondary client devices 210 and primary client device 245. In implementations, the network identifier may be a service set identifier (SSID) or other network identifier.

In still other implementations, responsive to a user request for a group gameplay feature, collaboration platform 120 may send a group gameplay identifier to primary client device 245. The group gameplay identifier may, for example, be displayed on the primary display 250 by the primary client device 245. Users of the secondary client devices 210 may input the group gameplay identifier into their respective secondary client devices 210 and send a request (that includes the group gameplay identifier) to collaboration platform 120 for an invitation to join the group gameplay.

At operation 318, collaboration platform 120 may send invitations to the secondary client devices 210 to invite the identified users to participate in the group gameplay of the game. The users may be the users identified in operation 316. In some implementations, the invitation may include a resource locator (e.g., link) that responsive to being selected may take the user (e.g., user's character) into the particular game. The invitation may also include a server identifier (e.g., unique identifier to the particular group gameplay session). As described below at operation 322, the server identifier may be used to identify a particular server on which the character for the game is to be hosted.

At operation 320, one or more secondary client devices 210 send to collaboration platform 120 responses to the invitation to participate in the group gameplay of the game. In some implementations, a response may be a user acceptance or user decline.

At operation 322, collaboration platform 120 identifies a server (e.g., cluster of hardware servers) on which to host the characters of the users that accepted the invitation to participate in the group gameplay of the game. As noted above, the invitations may include a server identifier that may be used to identify a particular server on which the character for the game is to be hosted. In some implementations, the server identifier may also identify a server on which the game is hosted. In some implementations, responsive to receiving user acceptances to the invitations to participate in the group gameplay of the game, collaboration platform 120 directs characters associated with the users to be hosted on a particular server computer based on the server identifier.

In some implementations, the server identifier may be a unique identifier associated with the particular group gameplay session for the primary client device 245. The server identifier may be used to identify the server on which the characters of the users are to be hosted (which may or may not be the same server on which the game is hosted). In some implementations, the server identifier may be the resource locator (e.g., unique link) sent in the invitations. In other implementations, the server identifier may be embedded in the resource locator or distinct from the resource locator.

It may be noted that hosting the characters (or characters and game) on a common server may allow for greater efficiency in the use of computing resources. For example, game logic executing on the common server may be shared between multiple characters. For instance, a character hits a wall and the server uses the physics engine to calculate physics commands indicative of the physical interaction of the character with the wall. If another character hits the same wall in the same or similar manner, the physics commands that were previously calculated may be cached and reused for the other character's collision with the wall. In other implementations, the characters may not be hosted on a common server.

At operation 324, the secondary client device 210 sends control instructions to the collaboration platform 120 responsive to user input to the secondary client device 210 to control in-game actions in the game. As noted above, the secondary client device 210 may be used as a game controller to control the game hosted by collaboration platform 120. The control instructions may refer to instructions that are indicative of in-game actions of the user's character. For example, control instructions may include user input to control the in-game action, such as right, left, up, down, user election, gyroscope position and orientation data, force sensor data, etc. The control instructions may include character position and velocity information. In implementations, the control instructions are sent directly (e.g., perhaps being sent through intermediary nodes none of which are the primary client device 245) to the collaboration platform 120 having bypassed the primary client device 245.

In some implementations, the primary client device 245 may receive the control instructions from the secondary client devices 210 (e.g., the primary client device 245 includes a router for the LAN) but the control instructions may still bypass the primary client device 245. For instance, the primary client device 245 may not execute the control instructions or render any gameplay for display on the primary display 250 based on the received control instructions. The received control instructions are routed to the collaboration platform 120 without additional processing outside the transmission operations.

At operation 326, collaboration platform 120 performs server-side processing on the control instructions to generate gameplay instructions. The gameplay instructions may be instructions that allow a client device, such as primary client device 245 or secondary client device 210, to render gameplay of a game, such as a multiplayer game. The control instructions may include one or more of user input (e.g., control instructions), character position and velocity information, or commands (e.g., physics commands, rendering commands, etc.). In some implementations, both the collaboration platform 120 and primary client device 245 (and secondary client device 210) execute a game engine 124. The collaboration platform 120 may perform some or all the game engine functions (e.g., generate physics commands, rendering commands, etc.), or offload some or all the game engine functions to primary client device 245. In some implementations, each game may have a different ratio between the game engine functions that are performed on the collaboration platform 120 and the game engine functions that are performed on the primary client device 245 (or secondary client device 210). For example, the game engine 124 of the collaboration platform 120 may be used to generate physics commands in cases where there is a collision between at least two game objects, while the additional game engine functionality (e.g., generate rendering commands) may be offloaded to the primary client device 245. In some implementations, the ratio of game engine functions performed on the collaboration platform 120 and primary client device 245 may be changed (e.g., dynamically) based on gameplay conditions. For example, if the number of user participating in group gameplay on the primary client device 245 exceeds a threshold number, the collaboration platform 120 may perform more game engine functions so that that the primary client device 245 is not overworked or to improve latency.

At operation 328, responsive to receiving the control instructions (e.g., operation 324) that have bypassed the primary client device 245, collaboration platform 120 provides first gameplay instructions to the primary client device 245 that cause a presentation of a first view of the gameplay of the game on the primary display 250. For example, primary client device 245 may use the gameplay instructions to generate display instructions (e.g., rendering commands) to render real-time gameplay on the primary display 250. In some implementations, the first gameplay instructions are sent from collaboration platform 120 directly (e.g., perhaps being sent through intermediary nodes none of which are the secondary client devices 210) to the primary client device 245 having bypassed the secondary client devices 210.

As noted above, the gameplay may be presented on the primary display 250 in a view from a perspective where all the playing users may watch the gameplay of their respective characters. For example, the view on the primary display 250 may be from the third-person perspective, such as top-down view or side view. In another example, the view on the primary display 250 may be from a first-person perspective, such as split-screen view where all the characters participating in the group gameplay are shown in a section of the split screen from a first-person perspective. Examples of different views are further illustrated in FIG. 4A-4C.

It may be noted that primary client device 245 may execute rendering commands to provide the first view of the gameplay on the primary display 250. In implementations, the rendering commands are not based on control information received directly from the game controllers (or native game controllers to the primary client device 245). In implementations, the primary client device 245 only is responsive to gameplay instructions from the collaboration platform 120 (e.g., the primary client device 245 is performing game engine functions, but only from instructions from collaboration platform 120) and is not receiving input from secondary client devices 210. Such a system architecture (e.g., system 200) allows the primary client device 245 to operate more efficiently by dedicating computing resources to handling gameplay instructions from collaboration platform 120, rather than dedicate computing resources to sending, receiving, and processing instructions from both collaboration platform 120 and game controllers (e.g., secondary client devices 210 or native game controllers). Additionally, collaboration platform 120 may change the ratio of game engine functions that are performed on the collaboration platform 120 and primary client device 245 to enhance the performance of the primary client device 245 (e.g., reduce the computational load on the primary client device 245).

At operation 330, collaboration platform 120 provides second gameplay instructions to the secondary client device 210. The second gameplay instructions may cause a presentation of the gameplay to be presented on displays of the secondary client device 210. In implementations, the second view of the gameplay on the secondary client device 210 is different than the first view of the gameplay on the primary display 250. For example, the view on a secondary client device 210 may be from a first-person perspective. The view on the primary client device 245 may be from a third-person perspective. In implementations, the views on the secondary client devices 210 may be different from one another. For example, the views on the secondary client devices 210 may be from a first-person perspective of the respective characters associated with the users of the respective secondary client devices 210. In some implementations, the view on the secondary client device 210 may include user controls (e.g., up, down, right, left, user selection user interface such as "A" and "B") to control the in-game actions. In some implementations, the view presented on the secondary client device 210 may not include gameplay, but include additional information such as title of the game or user controls, for example. In some implementations, the second gameplay instructions are sent from collaboration platform 120 directly (e.g., perhaps being sent through intermediary nodes none of which are the primary client device 245) to the secondary client devices 210 having bypassed the primary client device 245.

At operation 332, secondary client device 210 may send a message (e.g., instant message) to another user (e.g., another of the secondary client devices 210) participating in the group gameplay. At operation 334, the message of operation 332 may be received by collaboration platform 120 and filtered. For example, the filter may search for and remove any inappropriate language or sensitive information (e.g., telephone number, address, credit card information). At operation 336, the filtered message is sent to primary client device 245 for display on the primary display 250. For example, the message may be displayed in a chat area that is associated with only the recipient user. In another example, the message may be displayed in a group chat area in the presentation on the primary display 250 where all the users of the group gameplay may participate in the discussion. In other implementations, the message may be sent to the secondary client device of the recipient of the message for presentation in the recipient's secondary client device.

As noted above, the group gameplay feature of a game may be implemented for another group of users located in a different location from the first group of users. In implementations, the second group of users may implement the group gameplay feature in a similar manner as described above. The second group of users may participate in a group gameplay session of the game using a second set of secondary client devices as game controllers, a different primary client device, and a different primary display.

In still other implementations, users may participate in the game that are not part of a group gameplay session. For example, a group of users may participate in a group gameplay session for a particular game and another person in a different location may be playing the same game. The person not participating in the group gameplay may not view the group gameplay from the view presented on the primary display 250, but may for example view the gameplay from a first-person perspective from their client device.

Figure 4C:
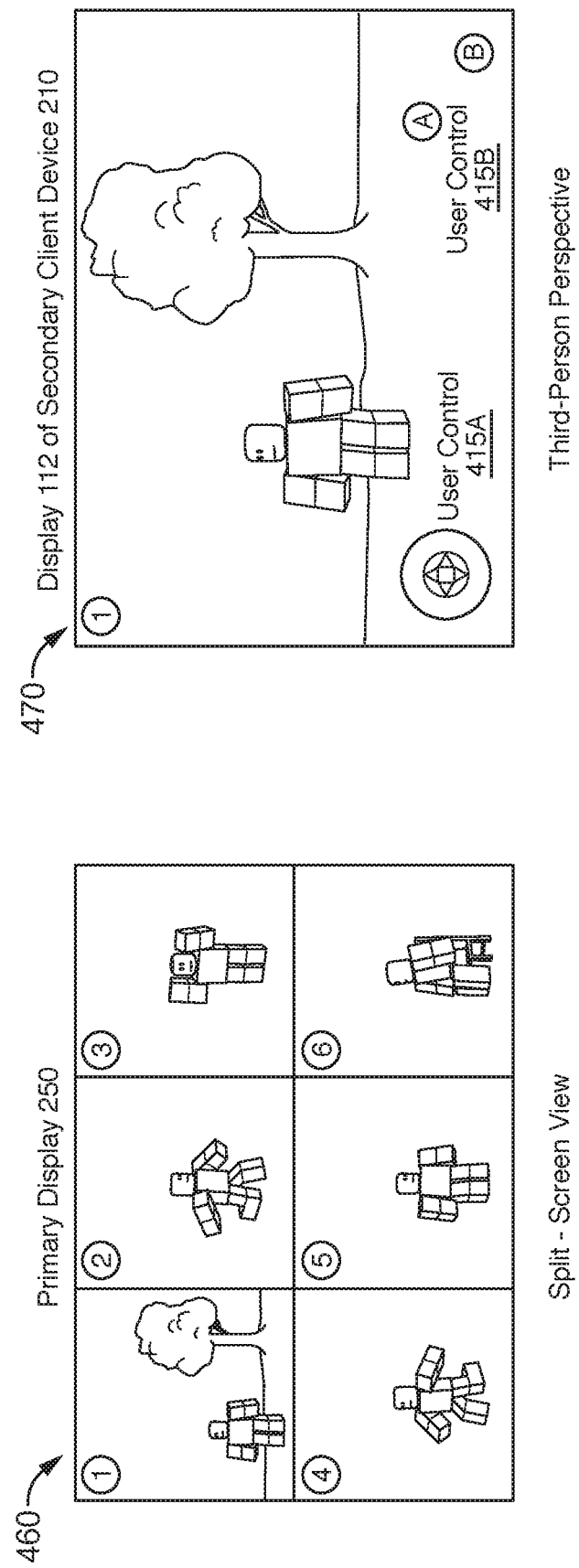

FIG. 4A-4C illustrate views of gameplay of a multiplayer game on a primary display and an views of gameplay on the display of a secondary client device, in accordance with implementations of the disclosure. It may be further noted that elements of previous Figures may be used to help illustrated the FIG. 4A-4C.

FIG. 4A illustrates view 400 of the gameplay of a multiplayer game on the primary display 250 and view 410 of the gameplay of the same multiplayer gem on the display 112 of the secondary client device 210 at a first point in time, in accordance with implementations of the disclosure. View 400 shows a top-down view of the gameplay as shown on primary display 250 (e.g., character positions on a racetrack). For example, the top-down view shows the world map of the game from the perspective of the camera above the game world and shows all the characters (e.g., 1 through 5) participating in the group gameplay of the game. View 410 shows a top-down view of character 1 as shown on display 112 of the secondary client device 210. View 410 shows only character 1 (e.g., in a car, i.e., game object 417) and a portion of the game world. View 410 shows user control 415A (a "joystick", e.g., up, down, right, left) and user control 415B (e.g., user selection "A" and "B") used to control in-game action of character 1. It may be noted that view 400 and view 410 show gameplay for the same point in time but from different views.

FIG. 4B illustrates view 430 of the gameplay of a multiplayer game on the primary display 250 and view 440 of the gameplay of the same multiplayer game on the display 112 of the secondary client device 210 at a second point in time, in accordance with implementations of the disclosure. View 430 shows a side view of the gameplay as shown on primary display 250. View 430 shows the actions of all the characters 1-5 concurrently. Additionally, view 430 shows message area 435 that may display the chat messages between all the characters, and in the current illustration between character 1 and character 2. View 440 shows a side view from the first-person perspective of character 1 as shown on display 112 of the secondary client device 210 (e.g., character 1 looking at character 2). It may be noted that view 430 and view 440 show gameplay for the same point in time but from different views.

FIG. 4C illustrates view 460 of the gameplay of a multiplayer game on the primary display 250 and view 470 of the gameplay of the same multiplayer game on the display 112 of the secondary client device 210 at a third point in time, in accordance with implementations of the disclosure. View 460 shows a split-screen view of the gameplay as shown on primary display 250. Each of the sections of the split-screen shows a view from a third-person perspective relative to the particular character. For example, the top left split-screen shows the view from the third-person perspective of character 1. In other implementations, the split-screen view may show the views from the first-person perspective of each of the characters. View 470 shows the view from the third-person perspective with respect to character 1. It may be noted that view 460 and view 470 show gameplay for the same point in time but from different views.

Figure 5:
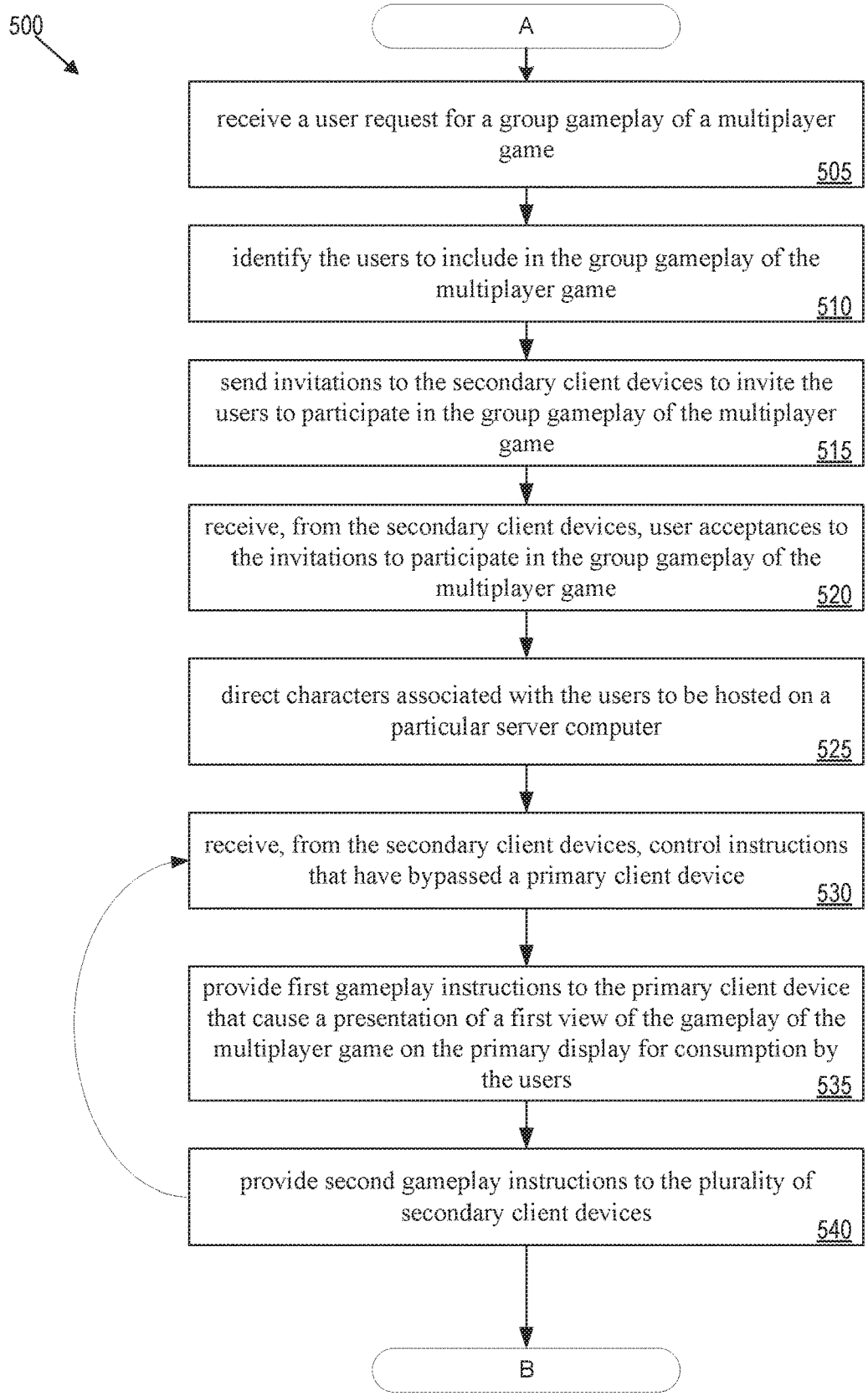
FIG. 5 is a flow diagram illustrating a method for implementing group gameplay of a multiplayer game for users that are proximately located, in accordance with implementations of the disclosure.

FIG. 5 is a flow diagram illustrating method 500 for implementing a group gameplay feature of a multiplayer game for users that are proximately located, in accordance with implementations of the disclosure. Method 500 may be performed by processing logic that includes hardware (e.g., circuitry, dedicated logic, programmable logic, microcode), software (e.g., instructions run on a processing device to perform hardware simulation), or a combination thereof. In some implementations, group gameplay module 140 executing at collaboration platform 120 may perform some or all the operations. In other implementations, group gameplay module 140 executing at collaboration platform 120, client device 110A, client device 110B, server 130 or combination thereof may perform some or all the operations. In some implementations, group gameplay module 140 executing at collaboration platform 120 (or server 230), secondary client devices 210, primary client device 245 or combination thereof may perform some or all the operations. Elements of FIG. 1 through 4C may be used to help illustrated method 500. It may be noted that the in some implementations, method 500 may include the same, different, fewer, or greater operations performed in any order.

At block 505 of method 500, processing logic performing method 500 receives a user request for group gameplay of a multiplayer game. The group gameplay enables users that are proximately located to participate in the multiplayer game using secondary client devices 210 as game controllers to control the gameplay and causes the gameplay to be presented on a primary display 250 for consumption by the users.

At block 510, responsive to receiving, from the primary client device, the user request for the group gameplay of the multiplayer game, processing logic identifies the users to include in the group gameplay of the multiplayer game.

At block 515, processing logic sends invitations to the secondary client devices 210 to invite the users to participate in the group gameplay of the multiplayer game.

At block 520, processing logic receives, from the secondary client devices 210, user acceptances to the invitations to participate in the group gameplay of the multiplayer game.

At block 525, responsive to receiving user acceptances to the invitations to participate in the group gameplay of the multiplayer game, processing logic directs characters associated with the users to be hosted on a particular server computer (e.g., server 230) based on the server identifier. In some implementations, the particular server computer also hosts the multiplayer game.

At block 530, processing logic receives, from the secondary client devices 210, control instructions that have bypassed a primary client device 245. The control instructions are responsive to user input to the secondary client devices 210 to control actions (e.g., in-game actions) in the multiplayer game.

At block 535, responsive to receiving the control instructions that have bypassed the primary client device 245, processing logic provides first gameplay instructions to the primary client device 245 that cause a presentation of a first view of the gameplay of the multiplayer game on the primary display 250 for consumption by the users. In some implementations, processing logic may return to block 530 and wait to receive additional control instructions that are used to generate new gameplay instructions (not shown).

At block 540, processing logic provides second gameplay instructions to the secondary client devices 210 based on the control instructions received by processing logic. The second gameplay instructions may cause presentations associated with the multiplayer game to be presented on displays 112 of the secondary client devices 210. In some implementations, processing logic may return to block 530 and wait to receive additional control instructions that are used to generate new gameplay instructions for the primary client device 245 or secondary client devices 210.

Figure 6:
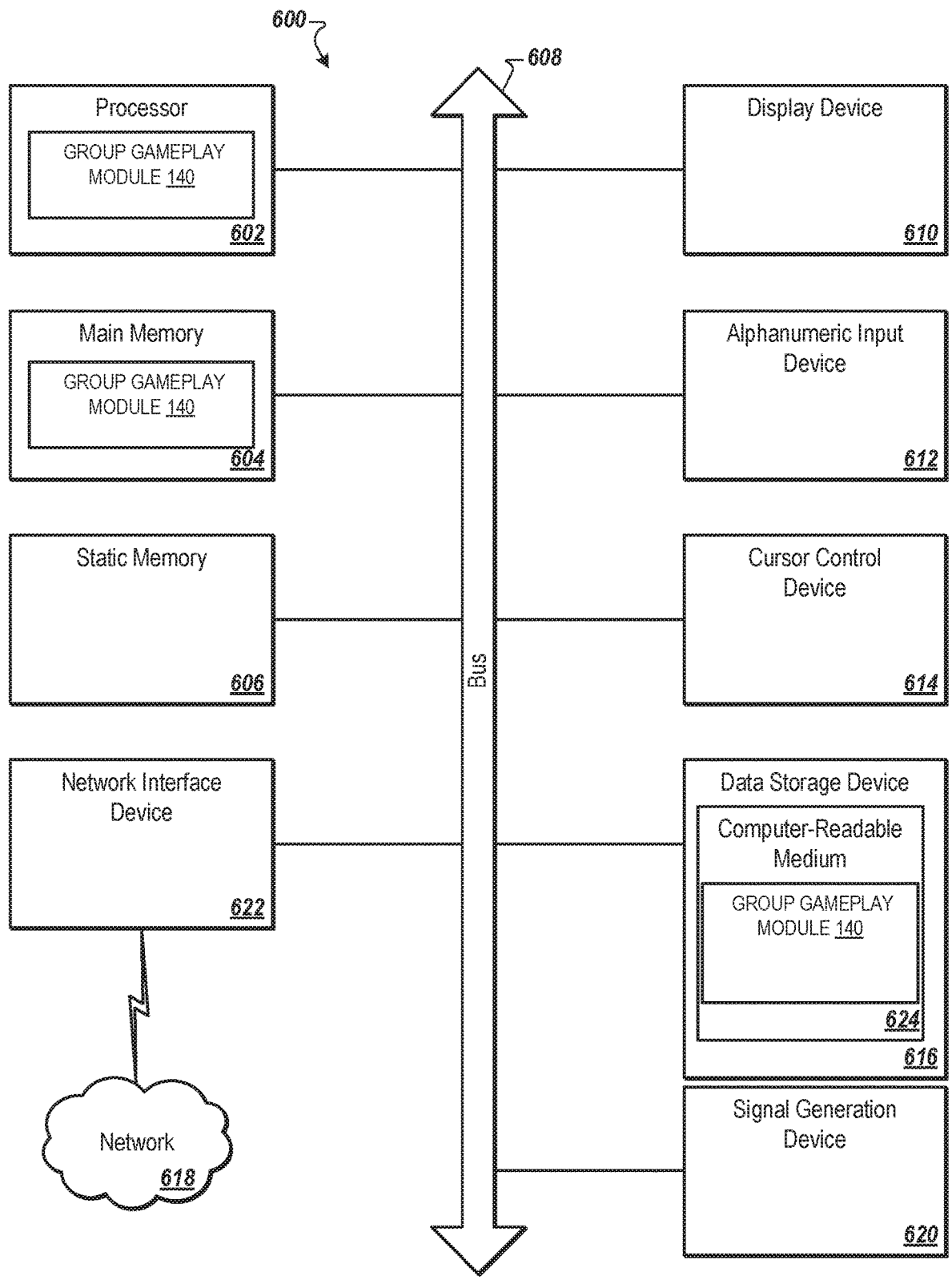
FIG. 6 is a block diagram illustrating an exemplary computer system, in accordance with implementations of the disclosure.

FIG. 6 is a block diagram illustrating an exemplary computer system 600, in accordance with implementations. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of group gameplay module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and the group gameplay module 140 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 and group gameplay module 140 embodying any one or more of the methodologies or functions described herein. The sets of instructions of the system architecture 100 and group gameplay module 140 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operation s leading to a desired result. The sequence of operations is those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "receiving," "providing," "receiving," "directing," "sending," "identifying," "implementing," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

I claim:

1. A method, comprising:
receiving, by a processing device, a user request for group gameplay of a multiplayer game, wherein the group gameplay enables users to participate in the multiplayer game using a plurality of secondary client devices as game controllers to control the group gameplay and causes the group gameplay to be presented on a primary display for consumption by the users;
receiving, by the processing device and from the plurality of secondary client devices, control instructions that have bypassed a primary client device in communication with the processing device, wherein the control instructions are responsive to user input to the plurality of secondary client devices to control actions in the multiplayer game; and
responsive to receiving the control instructions that have bypassed the primary client device, providing, by the processing device, first gameplay instructions to the primary client device that cause the primary client device to render a presentation of a first view of the group gameplay of the multiplayer game on the primary display for consumption by the users.

2. The method of claim 1, further comprising:
responsive to receiving, from the primary client device, the user request for the group gameplay of the multiplayer game, identifying the users to include in the group gameplay of the multiplayer game; and
sending invitations to the plurality of secondary client devices to invite the users to participate in the group gameplay of the multiplayer game.

3. The method of claim 2, further comprising:
receiving, from the plurality of secondary client devices, user acceptances to the invitations to participate in the group gameplay of the multiplayer game.

4. The method of claim 3, wherein the invitations comprise a server identifier associated with the group gameplay, and wherein the method further comprises:
responsive to receiving the user acceptances to the invitations to participate in the group gameplay of the multiplayer game, directing characters associated with the users to be hosted on a particular server computer based on the server identifier, wherein the particular server computer hosts the multiplayer game.

5. The method of claim 1, further comprising:
providing, by the processing device, second gameplay instructions to the plurality of secondary client devices based on the control instructions, wherein the second gameplay instructions cause presentations associated with the multiplayer game to be presented on displays of the plurality of secondary client devices.

6. The method of claim 5, wherein the presentations associated with the multiplayer game comprises a second view of the group gameplay of the multiplayer game, and wherein the first view of the group gameplay on the primary display is different from the second view of the group gameplay on the plurality of secondary client devices.

7. The method of claim 5, wherein the second gameplay instructions are provided by the processing device directly to the plurality of secondary client devices thereby bypassing the primary client device.

8. The method of claim 1, wherein the control instructions are received from a local area network (LAN) to which the plurality of secondary client devices are connected.

9. The method of claim 1, further comprising:
implementing, by the processing device, an additional group gameplay of the multiplayer game for other users, wherein the additional group gameplay enables the other users to participate in the multiplayer game using another plurality of secondary client devices as game controllers to control the group gameplay and causes the group gameplay to be presented on another primary display for consumption by the other users.

10. The method of claim 1, further comprising:
receiving, by the processing device, from a first client device of the plurality of secondary client devices, a message to a user of a second client device of the plurality of secondary client devices; and sending, by the processing device, the message to the primary client device to cause a presentation of the message on the primary display.

11. A system, comprising:
a memory; and
a processing device, coupled to the memory, and configured to:
  receive a user request for group gameplay of a multiplayer game, wherein the group gameplay enables users to participate in the multiplayer game by use of a plurality of secondary client devices as game controllers to control the group gameplay and causes the group gameplay to be presented on a primary display for consumption by the users;
  receive, from the plurality of secondary client devices, control instructions that have bypassed a primary client device in communication with the processing device, wherein the control instructions are responsive to user input to the plurality of secondary client devices to control actions in the multiplayer game; and
  responsive to receiving the control instructions that have bypassed the primary client device, provide first gameplay instructions to the primary client device that cause the primary client device to render a presentation of a first view of the group gameplay of the multiplayer game on the primary display for consumption by the users.

12. The system of claim 11, wherein the processing device is further configured to:
  provide second gameplay instructions to the plurality of secondary client devices based on the control instructions, wherein the second gameplay instructions cause presentations associated with the multiplayer game to be presented on displays of the plurality of secondary client devices.

13. The system of claim 12, wherein the presentations associated with the multiplayer game comprises a second view of the group gameplay of the multiplayer game, and wherein the first view of the group gameplay on the primary display is different from the second view of the group gameplay on the plurality of secondary client devices.

14. The system of claim 11, wherein the processing device is further configured to:
  implement an additional group gameplay of the multiplayer game for other users, wherein the additional group gameplay enables the other users to participate in the multiplayer game by use of another plurality of secondary client devices as game controllers to control the group gameplay and causes the group gameplay to be presented on another primary display for consumption by the other users.

15. The system of claim 11, wherein the processing device is further configured to:
  receive, from a first client device of the plurality of secondary client devices, a message to a user of a second client device of the plurality of secondary client devices; and
  send the message to the primary client device to cause a presentation of the message on the primary display.

16. A non-transitory computer-readable medium comprising instructions stored thereon that, responsive to execution by a processing device, cause to perform or control performance of operations comprising:
  receiving a user request for group gameplay of a multiplayer game, wherein the group gameplay enables users to participate in the multiplayer game using a plurality of secondary client devices as game controllers to control the group gameplay and causes the group gameplay to be presented on a primary display for consumption by the users;
  receiving from the plurality of secondary client devices, control instructions that have bypassed a primary client device in communication with the processing device, wherein the control instructions are responsive to user input to the plurality of secondary client devices to control actions in the multiplayer game; and
  responsive to receiving the control instructions that have bypassed the primary client device, providing first gameplay instructions to the primary client device that cause the primary client device to render a presentation of a first view of the group gameplay of the multiplayer game on the primary display for consumption by the users.

17. The non-transitory computer-readable medium of claim 16, wherein the operations further comprise:
  providing second gameplay instructions to the plurality of secondary client devices based on the control instructions, wherein the second gameplay instructions cause presentations associated with the multiplayer game to be presented on displays of the plurality of secondary client devices.

18. The non-transitory computer-readable medium of claim 17, wherein the presentations associated with the multiplayer game comprises a second view of the group gameplay of the multiplayer game, and wherein the first view of the group gameplay on the primary display is different from the second view of the group gameplay on the plurality of secondary client devices.

19. The non-transitory computer-readable medium of claim 16, wherein the operations further comprise:
  implementing an additional group gameplay of the multiplayer game for other users, wherein the additional group gameplay enables the other users to participate in the multiplayer game using another plurality of secondary client devices as game controllers to control the group gameplay and causes the group gameplay to be presented on another primary display for consumption by the other users.

20. The non-transitory computer-readable medium of claim 16, wherein the operations further comprise:
  receiving, from a first client device of the plurality of secondary client devices, a message to a user of a second client device of the plurality of secondary client devices; and
  sending the message to the primary client device to cause a presentation of the message on the primary display.

* * * * *